US009116250B2

(12) United States Patent  (10) Patent No.: US 9,116,250 B2
Gibson et al.  (45) Date of Patent: Aug. 25, 2015

(54) RADIATION DETECTOR FOR WELL-LOGGING TOOL

(71) Applicant: Schlumberger Technology Corporation, Sugar Land, TX (US)

(72) Inventors: Joshua W. Gibson, Missouri City, TX (US); Anthony F. Veneruso, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 204 days.

(21) Appl. No.: 13/797,299

(22) Filed: Mar. 12, 2013

(65) Prior Publication Data

US 2014/0263994 A1  Sep. 18, 2014

(51) Int. Cl.
*G01V 5/08* (2006.01)
*G01T 1/185* (2006.01)
*G01T 3/00* (2006.01)
*G01V 5/04* (2006.01)

(52) U.S. Cl.
CPC . *G01V 5/08* (2013.01); *G01T 1/185* (2013.01); *G01T 3/008* (2013.01); *G01V 5/04* (2013.01)

(58) Field of Classification Search
CPC .......... G01T 1/185; G01T 3/008; G01V 5/04; G01V 5/08; H01J 47/02
USPC ....................................................... 250/256
See application file for complete search history.

(56) References Cited

U.S. PATENT DOCUMENTS 4,938,281 A * 7/1990 Dierbeck .................. 165/109.1
5,067,808 A 11/1991 Alscher
5,180,917 A 1/1993 Wraight
5,422,480 A 6/1995 Schultz
2005/0247881 A1 11/2005 Kobayashi et al.
2011/0272570 A1* 11/2011 Xu et al. ..................... 250/269.4

FOREIGN PATENT DOCUMENTS

JP  02-183959 A  *  7/1990
JP  2005283493 A  10/2005
WO  2013016145 A1  1/2013

OTHER PUBLICATIONS

U.S. Department of Energy, "DOE Fundamentals Handbook", Instrumentation and Control, FSC-6910, Jun. 1992, 168 pages.
Wikipedia, "Gridiron Pendulum", Retrieved from http://en.wikipedia.org/wiki/Gridiron_pendulum on Jan. 24, 2014, 2 pages.
International Search Report and Written Opinion issued in PCT/US2014/021264 on Jun. 25, 2014, 14 pages.

* cited by examiner

*Primary Examiner* — David Porta
*Assistant Examiner* — Mindy Vu
(74) *Attorney, Agent, or Firm* — Michael Dae; Cathy Hewitt

(57) ABSTRACT

A radiation detector includes a housing to contain a radiation detecting gas. The housing has a first thermal expansion over an operating temperature range. An elongate electrode extends within the housing and has opposing first and second ends, with the first end secured to adjacent portion of the housing. The elongate electrode has second thermal expansion over the operating temperature range defining a difference with respect to the first thermal expansion. A temperature compensator is coupled between the second end of the elongate electrode and an adjacent portion of the housing. The temperature compensator has a third thermal expansion over the operating temperature range to maintain a tension on the elongate electrode within a desired range over the operating temperature range.

21 Claims, 3 Drawing Sheets

RADIATION DETECTOR FOR WELL-LOGGING TOOL

BACKGROUND

Radiation detectors used in well-logging tools employ gas ionization to detect various types of radiation, such as neutron radiation, beta particle radiation, gamma particle radiation, or X-ray radiation. A gas ionization radiation detector includes a gas chamber filled with helium-3, for example. The gas chamber also includes a thin, axially extending wire forming an electrode that acts as the anode, which is suspended within a cylindrical housing that acts as a cathode and forms the gas chamber. When connected to an appropriate source of high voltage, the housing and the wire create an electric field within the chamber. This radiation detector operates on the principle that a charged particle that travels through the gas will interact with the helium-3 and produce ions and electrons (e.g., ionization), which will drift towards the anode and generate avalanches that produce further electrons and ions, which are detected at the anode. In this manner, the gas ionization radiation detector detects radiation that travels through the gas chamber.

These helium-3 radiation detectors are susceptible to mechanical especially at high temperatures, which is compounded in petroleum downhole applications when a downhole tool carrying the radiation detector is inserted within the borehole and available space is limited. The downhole environment includes high pressures, high temperatures, substantial mechanical vibrations and strong mechanical shocks. The elongate electrode forming the anode is made from a metal such as a thin tungsten wire, whereas the cylindrical housing forming the outer chamber wall, i.e., cathode, is made from another metal that has a different and higher coefficient of thermal expansion (TCE). As temperature increases in the downhole environment, this difference in TCE results in higher tensile stresses on the thin wire forming the anode until the wire breaks. Also, the wire is more likely to fail whenever any increase in temperature is accompanied by mechanical shocks or vibrations, as in the case of the downhole applications. Even if the wire does not break, the helium-3 radiation detector performance is diminished if the tension required at the wire is not maintained within an established operating range.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A radiation detector includes a housing to contain a radiation detecting gas. The housing has a first thermal expansion over an operating temperature range. An elongate electrode extends within the housing and has opposing first and second ends, with the first end secured to an adjacent portion of the housing. The elongate electrode has a second thermal expansion over the operating temperature range defining a difference with respect to the first thermal expansion. A temperature compensator is coupled between the second end of the elongate electrode and an adjacent portion of the housing. The temperature compensator has a third thermal expansion over the operating temperature range to maintain a tension on the elongate electrode within a desired range over the operating temperature range.

A well-logging tool to be positioned in a wellbore of a subterranean formation includes a housing having a first thermal expansion over an operating temperature range. A radiation detecting gas is within the housing. An elongate electrode extends within the housing and has opposing first and second ends. The first end is secured to an adjacent portion of the housing. The elongate electrode has a second thermal expansion over the operating temperature range defining a difference with respect to the first thermal expansion. A temperature compensator is coupled between the second end of the elongate electrode and an adjacent portion of the housing. The temperature compensator includes a third thermal expansion over the operating temperature range to maintain a tension on the elongate electrode within the desired range over the operating temperature range.

A method of temperature compensation in a radiation detector is disclosed and includes a housing to contain a radiation detecting gas, the housing having a first thermal expansion over an operating temperature range. An elongate electrode extends within the housing and has opposing first and second ends. The first end is secured to an adjacent portion of the housing. The elongate electrode has a second thermal expansion over the operating temperature range defining a difference with respect to the first thermal expansion. The method includes coupling a temperature compensator between the second end of the elongate electrode and an adjacent portion of the housing. The temperature compensator has a third thermal expansion over the operating temperature range to maintain a tension on the elongate electrode within a desired range over the operating temperature range.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

Figure 1:
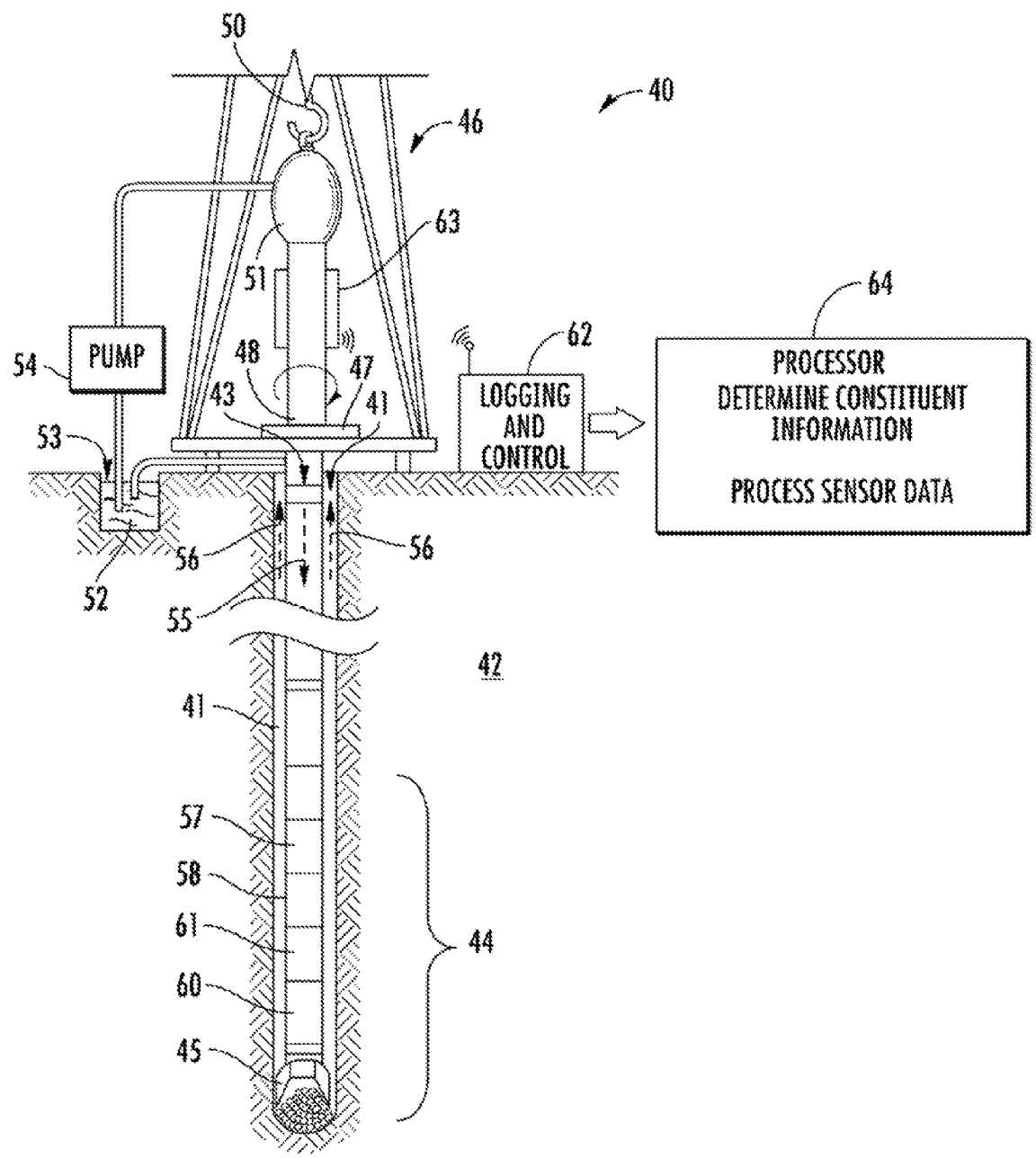
FIG. 1 is a schematic diagram of a well-logging system in accordance with an example embodiment.

FIG. 1 illustrates a well site system 40 in which various embodiments of a radiation detector 100 described below may be implemented. In the illustrated example, the well site 40 is a land-based site, but the techniques described herein may also be used with an offshore-based well site. In this example system, a borehole 41 is formed in a subsurface or geological formation 42 by rotary drilling, for example. Some embodiments may also use directional drilling.

Although this description proceeds with the description of a Drilling and Measurement (D&M) system that includes a drill string, it should be understood that a wireline or a Coiled Tubing conveyed drilling and logging system may be used. The radiation detector as described below may be used with any of these systems.

A drill string 43 is suspended within the borehole 41 and has a bottom hole assembly ("BHA") 44 which includes a drill bit 45 at its lower end. The system 40 further includes a platform and derrick assembly 46 positioned over the borehole 41. The assembly 46 illustratively includes a rotary table 47, Kelly 48, hook 50 and rotary swivel 51. The drill string 43 in this example may be rotated by the rotary table 47, which engages the Kelly 48 at the upper end of the drill string. The drill string 43 is illustratively suspended from the hook 50, which is attached to a traveling block (not shown). The Kelly 48 and the rotary swivel 51 permits rotation of the drill string relative to the hook. A top drive system (not shown) may also be used to rotate and axially move the drill string 43, for example.

In the present example, the system 40 may further include drilling fluid or mud 52 stored in a pit 53 formed at the well site (or a tank) for such purpose. A pump 54 delivers the drilling fluid 52 to the interior of the drill string 43 via a port in the swivel 51, causing the drilling fluid to flow downwardly through the drill string as indicated by the directional arrow 55. The drilling fluid exits the drill string 43 via ports or nozzles (not shown) in the drill bit 45, and then circulates upwardly through an annular space ("annulus") between the outside of the drill string and the wall of the borehole, as indicated by the directional arrows 56. The drilling fluid lubricates the drill bit 45 and carries formation cuttings up to the surface as it is cleaned and returned to the pit 53 for recirculation.

The BHA 44 of the illustrated embodiment may include a logging-while-drilling ("LWD") module 57, a measuring-while-drilling ("MWD") module 58, a rotary steerable directional drilling system and motor 60, and the drill bit 45. These modules are part of downhole tubulars formed from respective housings as illustrated.

The LWD module 57 may be housed in a special type of drill collar, as is known in the art, and may include one or more types of well-logging instruments, including example radiation detectors. It will also be understood that optional LWD and/or MWD modules 61 may also be used in some embodiments, (References, throughout, to a module at the position of 57 may mean a module at the position of 61 as well). The LWD module 57 may include capabilities for measuring, processing, and storing information, as well as for communicating the information with the surface equipment, e.g., to a logging and control unit 62, which may include a computer and/or other processors for decoding information transmitted from the MWD and LWD modules 57, 58 and recording and calculating parameters therefrom. The information provided by the MWD and LWD modules 57, 58 may be provided to a processor 64 (which may be off site, or in some embodiments may be on-site as part of the logging and control unit 62, etc.) for determining volumetric and other information regarding constituents within the geological formation 42 and process sensor data collected from sensors located in different modules.

A wireline cable may be used instead that includes a standard cable head connected at its lower end to a logging tool with a wireline cable extending to the surface of the borehole. During a logging operation, data may be transmitted from the logging tool to the wireline cable through the cable head and into the logging and control system 62 such as shown in FIG. 1. The downhole tubular may include one or more pressure bulkheads that enclose a protected area as an enclosure for a module and contain the electronic devices such as the radiation detector, including sensors for downhole logging and processors and other electronics. The bulkhead may form a pressure housing as part of the downhole tubular.

Figure 2:
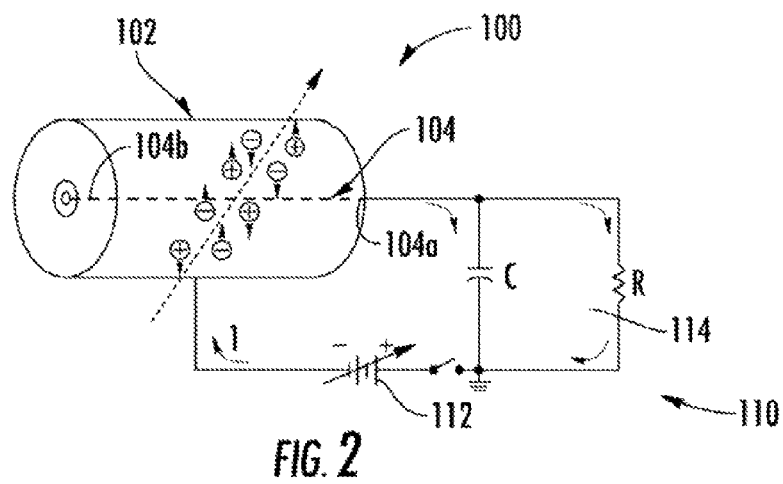
FIG. 2 is a schematic circuit diagram of a radiation detector to show basic operational principles.

FIG. 2 is a schematic circuit diagram of a radiation detector 100 and showing its operational characteristics and principles of operation. This radiation detector 100 includes a cylindrical housing 102 as a chamber wall and forming a gas chamber that contains a radiation detecting gas such as helium-3 and forming the cathode. This housing 102 has a first thermal expansion over an operating temperature range. An example operating temperature range is 0-260° C. An elongate electrode 104, e.g., a wire as the anode, extends axially within the housing 102 and has opposing first and second ends 104*a*, 104*b* secured at either end of the housing in this example. This elongate electrode has a second thermal expansion over the operating temperature range defining a difference with respect to the first thermal expansion. An electric current is provided between the cathode as the housing 102 and the anode as an elongate electrode 104 using an appropriate power circuit illustrated generally at 110. This circuit 110 includes a variable high voltage supply 112 and a parallel resistor and capacitor circuit 114. The circuit may include other components for high voltage production from an appropriate high impedance source and signal conditioning.

A neutron passing through the chamber may interact with the helium-3 atom to produce tritium (hydrogen-3) and a proton. The proton ionizes the surrounding gas atoms to create charges, which in turn, ionize other gas atoms in an avalanche-like multiplication process. These electrical pulses have an amplitude proportional to the neutron energy and are measured and compiled to form a pulse-height energy spectrum as a fingerprint to quantify neutrons and their energies.

The elongate electrode forming the anode shown in FIG. 2 has susceptibility to mechanical failure, especially at high temperatures because, for reasons of optimum performance, the electrode as the anode 104 is made of thin tungsten wire, whereas the housing 102 forming the chamber wall or cathode is made of another metal that has a different and typically higher coefficient of thermal expansion (CTE). As temperature increases, this difference in CTE results in higher tensile stress on the anode formed as a thin wire until the wire breaks, for example. For a tungsten wire diameter of 0.0005 to 0.001 inches, the desired tension may be 4.5 ounces and have a range of 4.2 to 4.8 ounces. The wire may be gold plated to improve gain and consistency along the wire. This range also corresponds to 119 to 136 grams with a 127.5 gram desired tension for a 12.7 to 25.4 micron diameter wire.

Also, the anode wire is more likely to fail whenever any increase in temperature is accompanied by mechanical shocks or vibrations as is the case for downhole applications. Even if the anode wire does not break, the desired tension on the wire for radiation detector performance is not maintained.

Some existing radiation detectors have an inherent mismatch of metal materials that results in excessive mechanical stress on the thin anode electrode extending axially within the housing. In accordance with a non-limiting example, a temperature compensator shown generally at 120 in FIG. 3 maintains tension on the elongate electrode forming the anode within a desired range over the operating temperature range. As illustrated in greater detail in FIG. 3, the housing 102 is electrically insulated and the anode is electrically insulated. The first end 104*a* of the electrode is the "live" end and connects to an electrical feedthrough 122 that also provides a pressurized, electrically insulated barrier. This "live" end connects to the external circuit 110 that provides both the high voltage from an appropriate high impedance source as well as signal conditioning for the voltages generated within the detector when neutrons are detected by well known effects. For performance purposes, the housing 102 is made of a metal that has a lower neutron cross section than the tungsten wire anode because tungsten's large neutron cross-section (18.3 Barns as an example) would adversely affect the performance of the He$^3$ detector. Example values of neutron cross-section of different cylinder materials are: 0.232 Barns for Al, 2.56 Barns for iron (Fe), 4.49 Barns for Nickel (Ni), and 37.2 Barns for Cobalt (Co)). Cobalt is usually not used as a material for the housing because its neutron cross section is more than twice that of tungsten forming the anode wire.

The materials used for the housing 102 that are acceptable for neutron detection performance have higher or lower TCE's than tungsten's TCE of 4.5 ppm/° C. For example the TCE of other metals possible for the housing as a cathode are: Aluminum CTE=23 ppm/° C., Stainless steel CTE=17.3 ppm/° C., Invar (Fe 64%, Ni 36%) CTE=1.2 ppm/° C. Although Kovar has a TCE of 5.5 ppm/° C., which is close to tungsten's TCE of 4.5 ppm/° C., Kovar is an alloy (Fe ~53%, Ni 29%, Co 17%) that contains a large amount of cobalt that may adversely affect the radiation detector's performance as a neutron detector.

Some spring mount membranes used for the tungsten elongate electrode have been found to lower the resonant vibration frequency of the elongate electrode and make it more susceptible to mechanical shocks and vibration fatigue failure. Also, a spring mount mechanism takes up space within the chamber and it distorts the electric field so that, a significant volume of the highly scarce He$^3$ is unusable within the radiation detector.

The temperature compensator 120 overcomes these drawbacks. An electrically insulated "dead" end is at the second end 104b of the anode 104 and opposite the "live" end. In accordance with a non-limiting example, the second end 104b of the elongate electrode as the anode is supported by an insulator member 126 connected to the temperature compensator 120 that is coupled between the second or "dead" end 104b of the elongate electrode and an adjacent portion of the housing 102. This temperature compensator 120 has a third thermal expansion over the operating temperature range to maintain a tension on the elongate electrode 104 as the anode wire within a desired range over the operating temperature range.

Figures 4A, 4B:
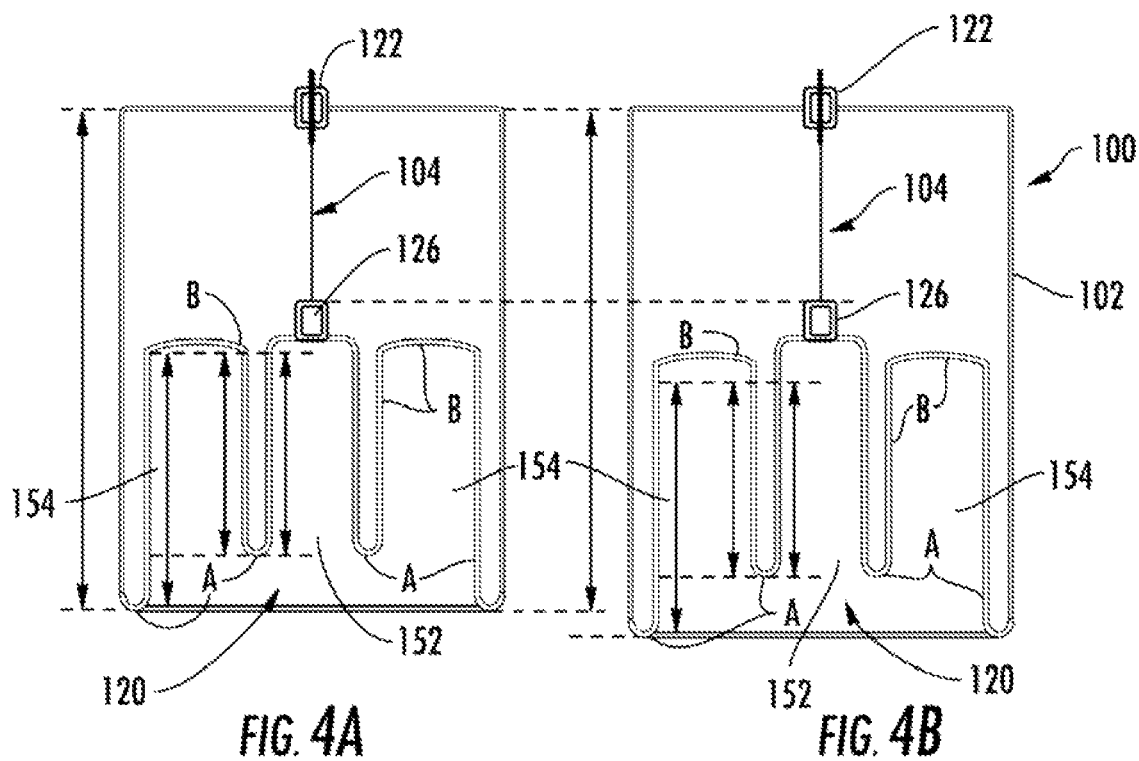
FIGS. 4A and 4B are schematic diagrams showing an example temperature compensator before and after heating to show how the temperature compensator will compensate for thermal expansion over an operating temperature range.

FIGS. 4A and 4B both show a more complete schematic of the housing 102 and a series of nested tubular sections 152, 154 that are formed from materials having different coefficients of thermal expansion. This series of nested tubular sections 152, 154 in one example are coupled together in a corrugated arrangement defining a bellows. These examples show this series of nested tubular sections 152, 154 that includes a radially inner most tubular section 152 secured to the second end 104b of the elongate electrode 104 at its "dead" end within the housing. This series of nested tubular sections includes a radially outer most tubular section 154 secured to the adjacent portion of the housing. FIGS. 4A and 4B are not to scale, but are illustrated to show the interrelationship among the components, including the housing 102, elongate electrode 104, feedthrough 122, insulator 126, and temperature compensator 120.

FIGS. 4A and 4B are also examples showing the wire anode and cylindrical chamber wall as the cathode before (left side) and after (right side) heating. The "live end" electrical feedthrough is illustrated at 122 and the "dead end" second end and its insulator 124. The nested tubular sections 152, 154 that form the temperature compensator are illustrated as formed from different materials having the two different coefficient of thermal expansions, indicated respectively as A and B. The nested tubular sections 152, 154 interoperate together similar to the gridiron pendulum clock temperature compensation made by Mr. John Harrison about 1726 in which upward expansion of one material counteracts the combined downward expansion of another material by having a different coefficient of thermal expansion. In a gridiron pendulum as used in a clock pendulum, the rod lengths are calculated so that the effective length of one rod formed from a specific material is multiplied by that material's expansion coefficient such that the product equals the effective length of the other rods formed from another material and multiplied by that second material expansion coefficient to maintain the pendulum at the same length as temperature changes. With the temperature compensator 120 design of FIGS. 4A and 4B, however, the electrode tension is maintained.

FIGS. 4A and 4B compare the temperature compensator at a first, lower temperature as shown in FIG. 4A and at an increased temperature for the radiation detector as shown in FIG. 4B in which the temperature compensator 120 maintains tension on the elongate conductor 104 as the anode within a desired range over the operating temperature range.

Reference is made again to FIG. 3 in which the length, Lt, of a temperature compensator 120 together with its material's TCE may be selected so as to compensate for the difference in the thermal expansion of the housing as the cathode relative to the wire elongate electrode as the anode, thereby ensuring a constant tension on the anode.

The basic design equation to ensure constant tension on the anode is:

$$Lt^*CTEt + Lc^*CTEc = La^*CTEa \qquad (Eq. 1)$$

where Lt is the length of the temperature compensator 120 and CTEt is its effective coefficient of thermal expansion, La is the length of the anode electrode and CTEa is its coefficient of thermal expansion, Lc is the length of the cathode housing and CTEc is its coefficient of thermal expansion.

The temperature compensator must accommodate the relative change in length due to the difference in coefficients of thermal expansion multiplied by the lengths involved as expressed by Eq 1 in the form:

$$Lt^*CTEt = La^*CTEa - Lc^*CTEc \qquad (Eq. 2)$$

For example, if the radiation detector has a wire anode length, La=10 cm, and is made of tungsten CTEa=4.5 ppm/° C., and its cathode is also 10 cm long and made of Invar, CTEc=1.2 ppm/° C., then using the example values yields:

$$Lt^*CTEt = 10^*(4.5 - 0.2) \qquad (Eq. 3)$$

Figure 3:
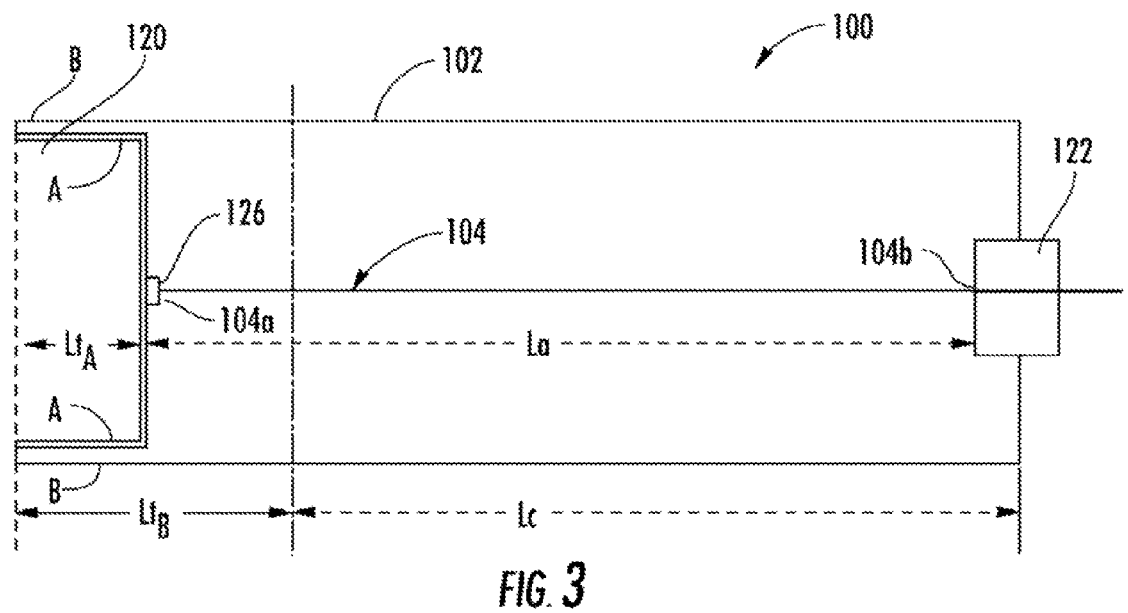
FIG. 3 is a schematic diagram of a radiation detector that may be used with the well-logging system of FIG. 1 in accordance with an example embodiment.

As shown in FIG. 3 the temperature compensator can be comprised of two materials A and B that can be selected such that Eq. 3 can be satisfied. For example, if the two compensator materials A and B each have lengths $Lt_A$ and $Lt_B$, respectively, equal to Lt, then the coefficient of thermal expansion of the compensator, CTEt is simply expressed as:

$$CTEt = CTEt_A - CTEt_B \qquad (Eq. 4)$$

where $CTEt_A$ and $CTEt_B$ are the coefficients of thermal xpansn of material A and B, respectively.

In the embodiment numerical example, if material A is made of Invar, $CTEt_A$=1.2 ppm/° C., and if material B is made of stainless steel $CTEt_B$=17.3 ppm/° C., then it follows from Eq. 3 that $$Lt^*(17.3 - 1.2) = 10^*(4.5 - 1.2) \qquad (Eq. 5)$$

Or simply $$Lt = 2.05 \text{ cm} \quad \text{(Eq. 6)}$$

The compensator's length can be reduced further by forming the temperature compensator 120 shown in FIGS. 4A and 4B as a tube within a tube structure, for example, similar to rotating a gridiron pendulum around the axis of its pendulum. If we again select material A to be stainless steel and material B to be Invar, then the nested tubular sections 152 and 154 each comprise a compensator and therefore each contributes to compensating the difference in coefficients of thermal expansion between the anode and cathode materials. If the lengths of the two nested tubular sections are approximately equal, then it follows from Eq.2 the required compensation length will be approximately one half that given in Eq 6.

Whereas the gridiron pendulum maintains constant length, this temperature compensator 120 maintains constant tension because as temperature changes, the change in length of the compensation cylinder equals the difference in the products of the respective lengths multiplied by the associated coefficients of thermal expansion of the anode and cathode according to Eq. 2.

Figure 5:
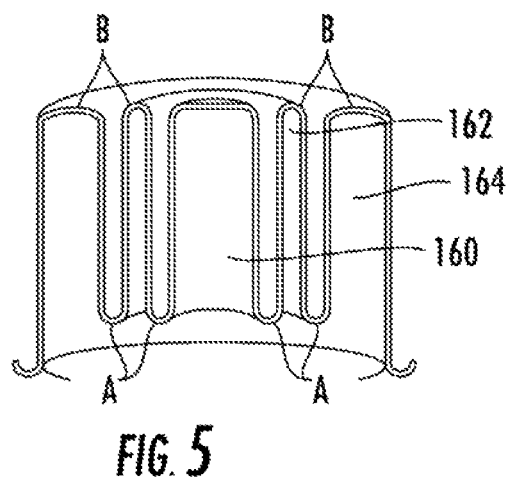
FIG. 5 is a schematic diagram of another example temperature compensator that can be used with the radiation detector shown in FIG. 3.

Using the above equations together with the embodiment example as a guide, the temperature compensator for different $He^3$ detectors is selected depending on its length and material used in construction. FIG. 5 shows an example where three tubular members 160, 162, 164 form a larger structure as compared to that shown in FIGS. 4A and 4B, but operates using the same principles.

As can be seen from the embodiment numerical example, the temperature compensator's materials and lengths can be selected to maintain constant tension in the anode in cases where the cathode, or housing, comprises a material having a lower coefficient of thermal expansion (CTE) than the CTE of the anode.

By reversing the roles, or selection, of compensator materials A and B, inspection of FIG. 3 and Eq. 4 shows the temperature compensator's materials and lengths can be also selected to maintain constant tension in the anode in those cases where the cathode, or housing, comprises a material having a higher coefficient of thermal expansion (CTE) than the CTE of the anode.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radiation detector comprising:
   a housing configured to contain a radiation detecting gas, wherein the housing comprises a first coefficient of thermal expansion over an operating temperature range;
   an elongate electrode extending within the housing, wherein the elongate electrode comprises a first end secured to the housing and a second end, wherein the elongate electrode comprises a second coefficient of thermal expansion over the operating temperature range different from the first coefficient of thermal expansion; and
   a temperature compensator coupled between the second end of the elongate electrode and the housing, wherein the temperature compensator comprises a third coefficient of thermal expansion over the operating temperature range that causes the temperature compensator to maintain a constant tension on the elongate electrode over the operating temperature range.

2. The radiation detector of claim 1, wherein the temperature compensator comprises a series of nested tubular sections.

3. The radiation detector of claim 2, wherein the series of nested tubular sections comprises materials having different coefficients of thermal expansion.

4. The radiation detector of claim 2, wherein the series of nested tubular sections is coupled together in a corrugated arrangement defining a bellows.

5. The radiation detector of claim 2, wherein the series of nested tubular sections comprises a radially innermost tubular section secured to the second end of the elongate electrode and a radially outermost tubular section secured to the housing.

6. The radiation detector of claim 1, wherein the temperature compensator does not comprise a spring.

7. The radiation detector of claim 1, wherein the housing comprises a cathode and the elongate electrode comprises an anode.

8. The radiation detector of claim 1, wherein said housing comprises a material having a higher the first coefficient of thermal expansion is greater than the second coefficient of thermal expansion.

9. The radiation detector of claim 1, wherein the first coefficient of thermal expansion is less than the second coefficient of thermal expansion.

10. A well-logging tool configured to be positioned in a wellbore of a subterranean formation, the well-logging tool comprising:
    a housing comprising a first coefficient of thermal expansion over an operating temperature range;
    a radiation detecting gas configured to be contained within the housing;
    an elongate electrode extending within the housing, wherein the elongate electrode comprises a first end secured to the housing and a second end, wherein the elongate electrode comprises a second coefficient of thermal expansion over the operating temperature range different from the first coefficient of thermal expansion; and
    a temperature compensator coupled between the second end of the elongate electrode and the housing, wherein the temperature compensator comprises a third coefficient of thermal expansion over the operating temperature range that causes the temperature compensator to maintain a constant tension on the elongate electrode over the operating temperature range.

11. The well-logging tool of claim 10, wherein the temperature compensator comprises a series of nested tubular sections.

12. The well-logging tool of claim 11, wherein the series of nested tubular sections comprises materials having different coefficients of thermal expansion.

13. The well-logging tool of claim 11, wherein the series of nested tubular sections is coupled together in a corrugated arrangement defining a bellows.

14. The well-logging tool of claim 11, wherein the series of nested tubular sections comprises a radially innermost tubular section secured to the second end of the elongate electrode and a radially outermost tubular section secured to the adjacent portion of said housing.

15. The well-logging tool of claim 10, wherein the temperature compensator does not comprise a spring.

16. The well-logging tool of claim 10, wherein the housing comprises a cathode and the elongate electrode comprises an anode.

17. A method of manufacturing a radiation detector comprising:
- forming a housing configured to contain a radiation detecting gas such that the housing comprises a first coefficient of thermal expansion over an operating temperature range;
- forming an elongate electrode extending within the housing such that the elongate electrode comprises a second coefficient of thermal expansion different from the first coefficient of thermal expansion over the operating temperature rate, wherein the elongate electrode comprises a first end secured to the housing and a second end; and
- forming a temperature compensator between the second end of the elongate electrode and the housing such that the temperature compensator comprises a third coefficient of thermal expansion over the operating temperature range that causes the temperature compensator to maintain a constant tension on the elongate electrode over the operating temperature range.

18. The method of claim 17, comprising forming the temperature compensator as a series of nested tubular sections.

19. The method of claim 18, wherein the series of nested tubular sections comprises materials having different coefficients of thermal expansion.

20. The method of claim 18, wherein forming the temperature compensator comprises coupling together the series of nested tubular sections in a corrugated arrangement defining a bellows.

21. The method of claim 18, wherein forming the temperature compensator comprises securing a radially innermost tubular section of the series of nested tubular sections to the second end of the elongate electrode and securing a radially outermost tubular section of the series of nested tubular sections to the housing.

* * * * *